ILLUMINATOR FOR OPTICAL PROJECTORS

Filed June 2, 1950 9 Sheets-Sheet 1

GEORGE J. KOCH, INVENTOR
BY Daniel J. Mayne
F.W. Emerson Holmes
ATTORNEYS

May 8, 1951 G. J. KOCH 2,552,184

ILLUMINATOR FOR OPTICAL PROJECTORS

Filed June 2, 1950 9 Sheets-Sheet 2

GEORGE J. KOCH, INVENTOR

BY Daniel J. Mayne
Wm. Emerson Holmes
ATTORNEYS

GEORGE J. KOCH, INVENTOR
Daniel J. Mayne
BY
FM Emerson Holmes
ATTORNEYS

ILLUMINATOR FOR OPTICAL PROJECTORS

Filed June 2, 1950 9 Sheets-Sheet 4

GEORGE J. KOCH, INVENTOR

BY Daniel I. Mayne

F. W. Emerson Holmes

ATTORNEYS

GEORGE J. KOCH, INVENTOR
BY Daniel J. Mayne
F.W. Emerson Holmes
ATTORNEYS

GEORGE J. KOCH, INVENTOR
BY Daniel J. Mayne
[signature]
ATTORNEYS

May 8, 1951 G. J. KOCH 2,552,184

ILLUMINATOR FOR OPTICAL PROJECTORS

Filed June 2, 1950 9 Sheets-Sheet 7

GEORGE J. KOCH, INVENTOR

BY Daniel J. Mayne
E.K. Emerson Holmes
ATTORNEYS

May 8, 1951 G. J. KOCH 2,552,184

ILLUMINATOR FOR OPTICAL PROJECTORS

Filed June 2, 1950 9 Sheets-Sheet 8

GEORGE J. KOCH, INVENTOR

BY Daniel J. Mayne
RM Emerson Holmes
ATTORNEYS

FIG. 21.
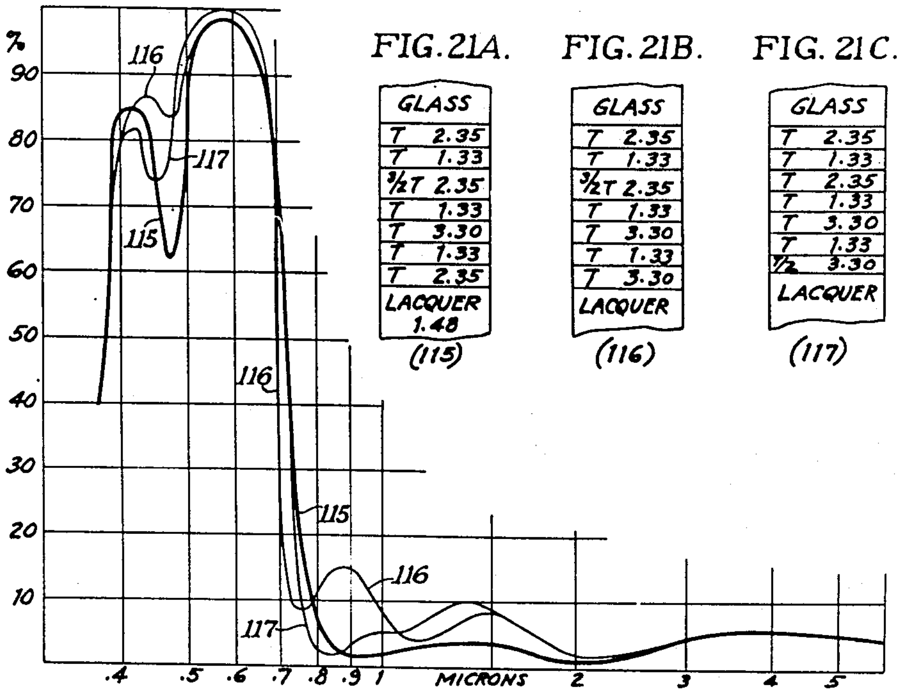
FIG. 21, FIG. 21A, FIG. 21B, FIG. 21C
FIG. 22.
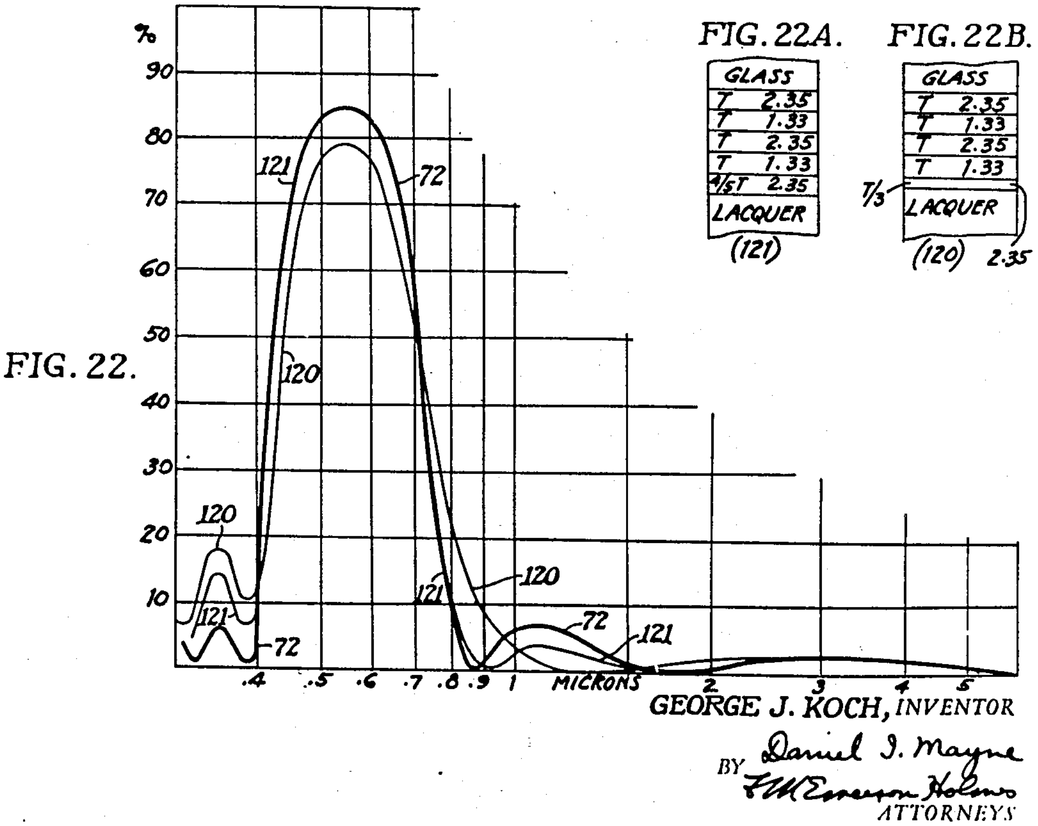
FIG. 22, FIG. 22A, FIG. 22B
GEORGE J. KOCH, INVENTOR
BY Daniel J. Mayne
F.W. Emerson Holmes
ATTORNEYS Patented May 8, 1951

2,552,184

UNITED STATES PATENT OFFICE 2,552,184

ILLUMINATOR FOR OPTICAL PROJECTORS

George J. Koch, Rochester, N. Y., assignor to Eastman Kodak Company, Rochester, N. Y., a corporation of New Jersey Application June 2, 1950, Serial No. 165,689

13 Claims. (Cl. 88—24)

This invention relates to illuminating systems for use in the projection of lantern slides or motion pictures either colored or black and white.

Two applications are co-filed to cover slightly different inventions for the same general purpose. The present application applies to illuminating systems using an incandescent source such as a tungsten projection lamp. The co-filed case Serial Number 165,690 involves a carbon arc high intensity light source.

It is the object of the present invention to reduce the heating of the transparency which is being projected. The invention is not primarily concerned with heating due to conduction or convection, but rather with the heating caused by absorption in the transparency of radiation from the light source. The absorption of visible radiation in the image itself cannot be eliminated since visible light is used for the projection. However, there is always a large percentage of infrared radiation from ordinary light sources either of the incandescent or arc type and it is the object of the present invention to reduce as far as possible the amount of infrared radiation passing from the source to the transparency.

So-called heat filters have been used for the above purpose and may be used along with the present invention. However, heat filters absorb the near infrared only moderately whereas the present invention is much more efficient in reducing the near infrared. Also heat absorbing filters of glass often crack due directly to the heat they absorb whereas the present invention eliminates the infrared without absorbing it so that there is no danger of an element cracking due to overheating.

It is also an object of the invention to provide high visible efficiency, i. e., to produce a high degree of brightness at the transparency from a light source of any given intensity.

It is an object of some embodiments of the present invention to provide a reduction of the intensity of the ultra-violet radiation passing from the source to the transparency since such radiation tends to fade color pictures. However, this feature is not as important as the heat elimination and ultra-violet absorbing filters are more or less satisfactory for this purpose anyway.

It is an object of this particular invention employing an incandescent source either to maintain the same spectral distribution of visible light in the beam illuminating the transparency as comes from the incandescent source or alternatively to increase the color temperature, i. e., to make the illuminating beam less reddish and more bluish to overcome the tendency of incandescent sources to be too reddish. In general, one does not want to convert the incandescent source all the way to the color temperature of daylight, but more pleasing color rendition is in general obtained with a color temperature slightly higher, i. e., slightly more bluish, than that obtained with a thousand watt incandescent tungsten lamp, for example.

*Prior art*

Since certain features of the present invention involve principles known to the prior art and on the other hand involve variations of these principles which are novel, as well as novel combinations of these features, the prior art is discussed briefly here. Multilayer optical interference coatings having high reflectivity are known. Such coatings consisting of alternate layers of high and low index materials which are either essentially 50% transmitting and 50% reflecting or appear blue by transmitted light and red by reflected light, are known. One important difference of the present invention from both of such systems is the fact that the multilayer coatings employed by the present invention have extremely high reflectivity throughout the whole of the visible spectrum; some of these coatings are over 90% reflecting throughout the whole of the useful visible spectrum from .45 to .67 micron. These coatings are either quite neutral in appearance or, for special purposes, they are only slightly yellowish or slightly bluish by reflected light.

As far back as 1939 the suggestion was made to use multilayer interference coatings which transmit visible light and reflect infrared radiation, as a direct substitute for heat filters. This really has nothing to do with the present invention although either ordinary heat filters or the substitute just mentioned may be used along with the present invention.

It was even broadly suggested that interference coatings reflecting one color and transmitting another, could be used wherever color filters are used. Ordinary filters distinguish radiation by absorbing some of it and transmitting the rest; dichroic interference coatings distinguish radiation by reflecting some wavelengths and transmitting the rest. As long as an optical system employs only the transmitted light, ordinary filters and dichroic coatings are equivalent, but the present invention is concerned with the reflected part as well as with the transmitted part of the light from the interference coating and therefore the equivalent result cannot be obtained with an ordinary color filter. In other words, the present invention is not the substitution of an interference coating for a color filter.

There is one peculiarity of interference coatings which is most clearly brought out by comparing one feature of the present invention with the corresponding effect obtained by the above discussed infrared reflecting heat filters. The characteristics of multi-layer interference coatings, as will be discussed in detail below, are such that they are not very efficient at reflecting all infrared radiation when they transmit visible radiation. On the other hand, when such coatings are made to reflect the visible radiation with extremely high efficiency, they, at the same time, transmit practically all of the infrared radiation. Plotting the reflection curve, one finds that the extremely long wavelength end of the spectrum is always transmitted and the first reflection band has a finite, relatively narrow, width. If this band is in the infrared so that visible light is transmitted, the band does not cover the whole of the infrared, whereas it does substantially cover the whole of the visible spectrum when it is in the visible region of the spectrum. The present invention usefully employs the reflected light only.

Specifically, when multi-layer coatings are made to reflect uniformly throughout the whole of the visible spectrum and to transmit highly the near infrared, the transmission band covers the whole of the effective infrared region of the spectrum, i. e. up to 4 or 5 microns or at least up to 2.75 microns where ordinary glass begins to absorb so as to remove the remainder of the infrared. Actually the multi-layer coatings are transparent to wavelengths even longer than 5 microns, but the energy emitted by incandescent light sources beyond 5 microns is usually less than 3 percent. Infrared reflectors when substituted for heat absorbing filters are not as optically efficient as the heat absorbing filters, although they are not as subject to breakage due to overheating. On the other hand, the present invention is much more efficient than an ordinary heat absorbing filter.

It should be particularly noticed that the present invention has to do with the reduction of heat in the transparency itself and is not concerned with cooling of the lamphouse by conduction or convection. The system does allow much of the infrared radiation to escape from the lamphouse and thus the invention has all of the advantages of the lamphouse shown in U. S. 2,466,430 Hutchison. However, it also has many advantages not obtainable with the Hutchison lamphouse and the latter is not concerned with the reduction of infrared in the radiation reaching the transparency.

*The invention*

According to the present invention, an illuminating system is made up of a gate for defining the position of a transparency, still or motion picture, during projection, a light source emitting visible light and a high percentage of infrared radiation and a glass reflector, which may be flat but which is preferably concave to produce a condensed light beam, for receiving the radiation from the source and for reflecting at least part of the visible radiation through the gate. Additional condenser lenses, heat filters and the like may be included in the system and the light may suffer two or more reflections at heat transmitting reflectors before reaching the transparency, but these are secondary or additional refinements not essential to the main invention. Multi-layer optical interference coatings are provided on one or both of the surfaces on the reflector and one of these coatings consists of high and low index materials alternately in at least four layers (preferably 5 or 7 layers), each of which is less than a wavelength of visible light thick. Essentially the main four layers alternate in index, but special embodiments may have additional layers of different sequence. The basic system has the layers alternating in index and each of them a quarter wavelength of light thick for green light. The most preferred embodiments do not have this simple form, however, but all embodiments reflect most of the visible radiation and transmit most of the infrared radiation. This result is obtained by having the first high reflectivity band on the long wavelength end of the spectrum in the visible part of the spectrum with the steep long wavelength side of this band effectively between .67 and .8 micron. There is at least a drop in reflectivity from greater than 80% at .65 to less than 20% at .8 or .9 micron wavelength.

Preferably the surface of the glass reflector farthest from the source is the one provided with the coating just discussed and this coating includes an outside layer of relatively great thickness, of protective lacquer. The first and most obvious advantage of this embodiment is the added protection which the coating has, first since it is laminated between glass and the protective lacquer and second since the glass itself protects it from the sputtering of the arc. A second, not so obvious advantage of a lacquered interference coating, whichever side of the reflector it is on, is the increased optical efficiency as far as transmitting infrared is concerned. The so-called infrared "side bands" in the reflectivity curve are reduced in the lacquer embodiment when compared to those in which the coating is in contact with air.

*Vector analysis*

In discussing the present invention, the essential physical characteristic of each layer and interface of the multi-layer coating is the vector determined by the index break at the interface (or more exactly by the break in refractive and the absorption index), and by the thickness of each layer. This vector is the measure of a physical characteristic just like mass, length, velocity, momentum, elasticity or index of refraction. Specific embodiments of the invention involving optical interference must specify vectors for the interfaces involved. Vectors have magnitude and direction, the magnitude being called the scalar part of the vector. The vector at the first interface has a magnitude, determined by the index break, and a direction which is arbitrarily selected. All other directions are then specified with reference to the direction of the original vector. The direction of each vector corresponds to its phase angle, which in turn is determined by the optical thickness of each layer. The magnitude of the vector in the second interface is determined by the index break at this interface and its direction relative to that of the first vector is determined by the thickness of the first layer, the thickness being less than a wavelength of visible light.

Since rigid vector analysis is tedious even with automatic computing machines, a number of factors can be approximated at least for first order computation, provided one understands the corrections necessary for rigorous interpretation of these approximations. For example, vector addition is employed only in its simplest form and complex vector operations such as vector multiplication are not involved, at least as far as the elementary theory necessary for full understanding of the present invention is concerned.

The thickness of the layer which is used in determining the direction of the vector is the optical thickness which equals the actual thickness multiplied by the index of refraction of the layer for the particular wavelength involved. There are of course vectors representing both the reflection and the transmission at the individual interfaces and for the coating as a whole. The present invention is defined in terms of the reflection vectors.

Furthermore, vectors are computed for the amplitude of the light wave involved and the vector sum for all of the interfaces is itself another amplitude vector. This vector sum has the scaler part thereof squared to give the reflection intensity. The amplitude vector with the scaler part squared is sometimes termed the intensity vector. For any one wavelength this reflection intensity vector is discussed in terms of percentage reflection. For example, some embodiments of the present invention have a reflection intensity vector more than 95% in the green region of the spectrum and less than 5% in the near infrared. Vector amplitudes are never squared before the addition thereof; they are added vectorially first, and the resultant vector or at least the scaler part thereof is then squared, in the simple first order analysis and computations employed in the practice of the present invention.

The resultant amplitude reflected from the combination of layers is the vector sum of the component amplitudes reflected at each film interface, the contribution due to multiple-reflections between the interfaces introduces a factor mentioned below. For a given multi-layer film the resultant amplitude is primarily a function of the angles between the component vectors. When the vectors are in line or in the same general direction, they add vectorially to give a resultant higher reflection, but when they are not in the same general direction they tend to cancel one anoothher and hence to give a resultant low reflection. The angles between the vectors, as already explained, depend on the optical thickness of the films and on the wavelength of the light. For a given multi-layer film the angles between the vectors change with the wavelength of the light, even in the ideal case of no dispersion of index, because the wavelength itself changes whereas the thickness stays the same. For some wavelengths, e. g. throughout the visible spectrum, the vectors are pointed in the same general direction and add to give a resultant higher reflection, but for other wavelengths, e. g. in the infrared and near ultraviolet parts of the spectrum, the vectors are at such angles that they tend to cancel one another and hence to give a low resultant reflection.

For the purpose of understanding the invention, and for the first order approximation in making computations relative thereto, it is sufficient (*a*) to take into account only one reflected light vector for each film interface, (*b*) to consider the amplitude of this vector independent of wavelength, (*c*) to ignore phase changes other than 0 and 180 degrees which sometimes occur on reflection and (*d*) to make further simplifying assumptions. In particular cases such simplifications may lead to serious errors, but these are recognized as such and estimated corrections can be made therefor. The following are the additional corrections to these first order computations which are required in precise work.

1. Multiple-reflection correction
2. Correction for angles of incidence other than 0°
3. Correction for attenuation caused by absorption
4. Dispersion correction of vector amplitudes
5. Dispersion correction of film thickness
6. Correction for phase changes other than 0° and 180°

These corrections are listed in the approximate order of their importance. They are each discussed briefly below.

1. Multiple-reflections in each layer and between layers have a pronounced influence on the shape, height and width of the reflection maxima in the reflection intensity vs. wavelength curve. The computations in taking multiple reflections into account are complex and for most purposes it is sufficient to make calculations without taking these multiple reflections into account and then to add a simple correcting factor. The interference mirror used in the present invention utilizes the reflection maximum on the long wavelength end of the spectral curve, i. e. the so-called first order reflection maximum, for separating visible light from infrared. Thus a detailed knowledge of the shape, height and width of this first order reflection maximum is imporant to the efficient design of multiple film combinations of the type herein described. Analytical computations which allow fully for multiple reflections are long and tedious but graphical methods and simple analogue computers give adequate results. Furthermore, for regions of the spectrum where the reflectance is low, i. e. for the entire infrared region the multiple reflections can be ignored without serious error. The curves discussed below and shown in the accompanying drawings have been computed with multiple reflections taken into account. In all of the following description, the term "first order approximation" means that multiple reflections have been taken into account but that dispersion, absorption, and large angles of incidence have not been considered.

2. The effective thickness of a film, as far as interference effects are concerned, is proportional to the cosine of the angle between the light ray in the film and the normal to the film, and hence the phase angle between reflected components decreases with increasing angle of incidence. Furthermore, for angles of incidence other than 0° the reflected amplitude increases for the component polarized perpendicular into the plane of incidence and decreases for the component polarized parallel to the plane of incidence. Both of these effects are small for angles less than 25°, but must be taken into account in designing reflectors at 45° for example.

3. Attenuation of the reflection vectors caused by light absorption in the film results in a marked decrease in reflection. This effect is negligible for most low index and even for many high index films, but materials with refractive indices greater than 3.0 normally have appreciable absorption in the blue and ultraviolet parts of the spectrum which must be considered in the design of interference films. The reflection vectors at the boundaries of high index films in the parts of the spectrum where their absorption is appreciable is determined both by the refractive index and by the absorption index. Strictly speaking, the vector amplitudes and phase angles should be calculated in this case by using the complex refractive index instead of the real part of the refractive index.

4. The appreciable increase in refractive index of the high index film with decreasing wavelength results in a greater index break in each interface for short wavelengths than for long wavelengths. Thus the reflected vector amplitudes increase toward the blue end of the spectrum and tend to make the resultant reflectance bands higher and broader than those computed for the average refractive index.

5. The same increase in refractive index of both the high and low index films toward the blue end of the spectrum causes the films to have a greater optical thickness for blue light than for red or infrared light and the ratio of optical thicknesses of the high index layers to the low index layers also increases toward the shorter wavelengths. Both of these dispersion effects (items 4 and 5) cause significant changes in the resultant reflectance vs. wavelength curves. For instance, the subsidiary reflection bands in the infrared parts of the spectrum actually come at wavelengths shorter than those predicted by first order approximate computations which ignore the decrease in refractive index with increasing wavelength. These effects are usually taken into account by estimated corrections or by separate calculations with different indices of refraction over different regions of the spectrum. The present invention is, in general, described without reference to the effect of dispersion, which is usually a second order effect.

6. When reflection occurs at an interface between two materials one or both of which has an appreciable absorption constant, a phase change other than 0° or 180° occurs. Thus for some materials and some wavelengths a further correction of the first order theory is required. This phase change does not vary rapidly with wavelength and, if desired, it is compensated for by adjustments of film thickness. As discussed at length below, the absorption is sometimes utilized or compensated for in various embodiments of the invention and this utilization or combination is in terms of the effective absorption which can be considered to take into account the effect of the phase change here discussed.

In the above discussion reflection amplitude vectors and intensity vectors are considered for one wavelength at a time. However, it is customary to discuss reflection intensity either at a single wavelength or over a range of wavelengths. By convention, the intensity over a range of wavelengths equals the average of the reflection intensities at wavelengths throughout the range specified. For example, the reflection intensity in certain embodiments of the invention average more than 80% in the green region of the spectrum between .52 and .60 micron which means that the reflection intensity for this range is more than 80% although at any one wavelength within this range the intensity may be less than 80%.

*Preferred embodiments of the invention*

Alternating quarter wavelength layers of high and low index materials such as zinc sulfide and magnesium fluoride, reflect highly the wavelength for which the thickness is said quarter wavelength. If only three layers are used, the reflection curve has gently sloping sides so that when it peaks in the green there is too little reflectivity in the blue and red and there is too much reflectivity in the infrared. As the number of layers is increased, the spectral width of the first order reflected band becomes less and the maximum reflection within this band becomes greater. The present invention requires at least four layers in order to obtain enough visible reflection to be useful and to produce a curve which falls off faster in the infrared than the transmission of ordinary heat filters. On the other hand, if one employs seven or more layers in the simple embodiment just described, the reflected light covers only a relatively narrow spectral region which tends to color the light and hence is not useful in simple systems employing incandescent tungsten but such seven layer coatings are particularly useful for correcting the emission from highly colored sources. On the other hand, there are two very important variables which are introduced in preferred embodiments of the present invention.

The most important of these is to provide an exceptional high index break exceeding 1.6 at at least two of the interfaces. There are a number of satisfactory materials whose index exceeds 3 and any such high index material can be used with cryolite, for example, as the low index material with an index, in thin layers, less than 1.4. The actual index of any particular layer varies slightly depending on the conditions of deposition of the layer, but for cryolite it is satisfactory to assume that the index is 1.33 and in practice it has been found not to vary far from this. Similarly it is customary to take the index of refraction of zinc sulfide as 2.35 and that of stibnite as that of 3.30, in the green region of the spectrum. Index of refraction falls off toward longer wavelengths.

The second variable involves changing the thickness of one or more of the layers in the multi-layer coating. In fact, in practice it is difficult to produce a layer whose optical thickness is accurate within a few per cent and on the other hand, differences of only a few per cent do not in general have any appreciable or useful effect. Such variations explain small discrepancies between computed curves and actual measured curves. To obtain special effects, the layers must differ in thickness by a ratio of at least 5 to 4. Also extremely thin layers less than 1/12 of a wavelength of light, which is a third of a quarter wavelength, apparently serve no useful purpose and so far layers more than three times the thickness of the reference layer have not been found to give any useful effects. Thus it can be said that whenever thickness variations are introduced the useful ratio of optical thicknesses between two of the layers is between 1¼ and 3. This means that the variant layer or layers may be thinner than other layers by a factor of ⅓ to ⅘ or thicker by a factor of 5/4 to 3. The effect of this variation in thickness depends on which layer is changed. In a series of seven layers, for example, a change in the direction of the second vector of the series will give a different result from the same change in the direction of the fourth vector.

The effect of these changes in index break and thickness are different for different wavelengths and the ones to be selected depend on the spectral reflectivity desired for any particular purpose, within said limits.

When the number of layers in the coating is increased the reflection band tends to become narrower than the visible spectrum but this is overcome by the opposite effect introduced by the high index break. Many high index materials absorb in the blue region of the spectrum. This may be a characteristic of all high index materials which might be useful for the present invention because the high index may be due to the spectral proximity of an absorption band in the ultraviolet. When high index materials such as stibnite (index 3.30) having absorption in the blue, are used, a number of factors are introduced.

In the first place, as mentioned above, the spectral absorption is not a simple characteristic to be treated independently of the vector analysis. However, the effect of the absorption and the imaginary part of the refractive index show up in the measured curves as deviations from the computations and are not normally considered in making the computations.

The blue absorption may be compensated and in certain embodiments of the invention is compensated, by making the reflection vector sum a maximum in the blue or near ultraviolet region of the spectrum so that the total reflectivity is more or less neutral or has any predetermined distribution through the visible spectrum. Alternatively the blue absorption is used to compensate the blueness of a light source such as an arc lamp, or if it overcompensates, the maximum is again shifted toward the blue to compensate for the overcorrection.

Also in multi-layer coatings, one has a choice as to where any particular high index layer is placed and since the major portion of the reflection can be made to occur in the layers and interfaces nearest the source, zinc sulfide or titanium dioxide or other materials having an index or refraction between 2.0 and 3.0 and negligible absorption are preferably used as the high index material in the layers nearer the source, and stibnite or other material having an index greater than 3.0 and appreciable absorption are then used only in one or more of the high index layers farther from the light source.

The preferred materials with high refractive indices and negligible absorption in the visible spectrum are zinc sulfide, titanium dioxide and antimony trioxide. The preferred low index materials are magnesium fluoride, cryolite (sodium aluminum fluoride), calcium fluoride and silicon monoxide or dioxide. For films with refractive indices greater than 3 and with appreciable absorption particularly in the short wavelength part of the spectrum, the preferred materials are antimony trisulfide (stibnite), zinc telluride, iron oxide, tellurium, silicon and germanium. Very thin films of metals separated by layers of nonmetals can also be used instead of high index films. Since metallic layers absorb radiation over the entire range of the spectrum concerned in the present invention, their use is limited to layers farthest from the light source, for the same reason as that discussed above with respect to the blue absorbing films.

The coatings may be on either or both sides of the glass reflector. Either or both coatings may be provided with a relatively thick lacquer layer, i. e. a layer at least several wavelengths of light thick. Two reflecting layers may be used in optical succession in the system and the light either before or after reflection at an interference layer may pass through a heat absorbing filter.

When the invention is applied to illuminating systems having an incandescent (usually tungsten) light source, the reflection intensity vectors exceed 80% and preferably exceed 90% on the average for all wavelengths between .45 and .67 micron. The peak of the reflectivity curve falls at a point between .40 and .58 micron and is near .55 micron when the reflector is arranged to be substantially neutral so as not to affect the color temperature of the source appreciably. This peak, on the other hand, comes at a shorter wavelength nearer .40 or .45 when the mirror is to increase the color temperature of the source. The reflectivity curve falls off quickly in the infrared and has a minimum between .7 and 1.0 micron. The most preferred embodiments of the invention employing at least one high index layer with an index of refraction greater than 3 and having one of the layers with a thickness differing from that of the other layers by a ratio between 1¼ and 3 with the reflection intensity vectors throughout the infrared less than 20% at least out to 2 microns.

One very important feature which even without the high index materials and various thickness ratios, reduces the infrared side bands to less than 20%, is the presence of a lacquer layer on the outside of the multi-layer coating so that the multi-layer coating is sandwiched between glass and a relatively thick layer of lacquer. The type of lacquer is not particularly critical to the present invention, except that it should be colorless if it is used between the source and the interference films. Most lacquers have an index of refraction between 1.47 and 1.55. Of course, lacquer must adhere to the surface that is lacquered, but this apparently does not present any great problem since most lacquers adhere in a satisfactory manner to zinc sulfide or stibnite, particularly if the coating is allowed to age for a few hours before the lacquer is applied. The presence of a lacquer rather than air adjacent to the last high index layer reduces the reflectance minima in the infrared region of the spectrum nearly to zero and reduces the maxima also to a low value less than 15% computed by the first approximation method described above.

For reference, it is noted that the visibility function or response of the human eye has a maximum at about .55 micron wavelength and falls to less than 4% of this maximum at .45 and at .67 micron wavelength. Of course, visibility extends farther into the blue and into the red ends of the spectrum but the effective portion of the spectrum for projection purposes is between .45 and .67 micron.

The invention and preferred embodiments thereof will be fully understood from the following description when read in connection with the accompanying drawings, in which:

Fig. 1 schematically illustrates a simple embodiment of the invention employing a plano reflector with a multi-layer coating on the rear surface thereof.

Fig. 2 similarly illustrates an embodiment of the invention with the interference coating on the rear surface of a concave reflector.

Fig. 3 illustrates an alternative arrangement for one detail of Fig. 2 with the multi-layer coating on the first surface of a concave reflector.

Fig. 4 similarly illustrates an embodiment with coatings on both surfaces.

Figures 5, 6, 7, 8:
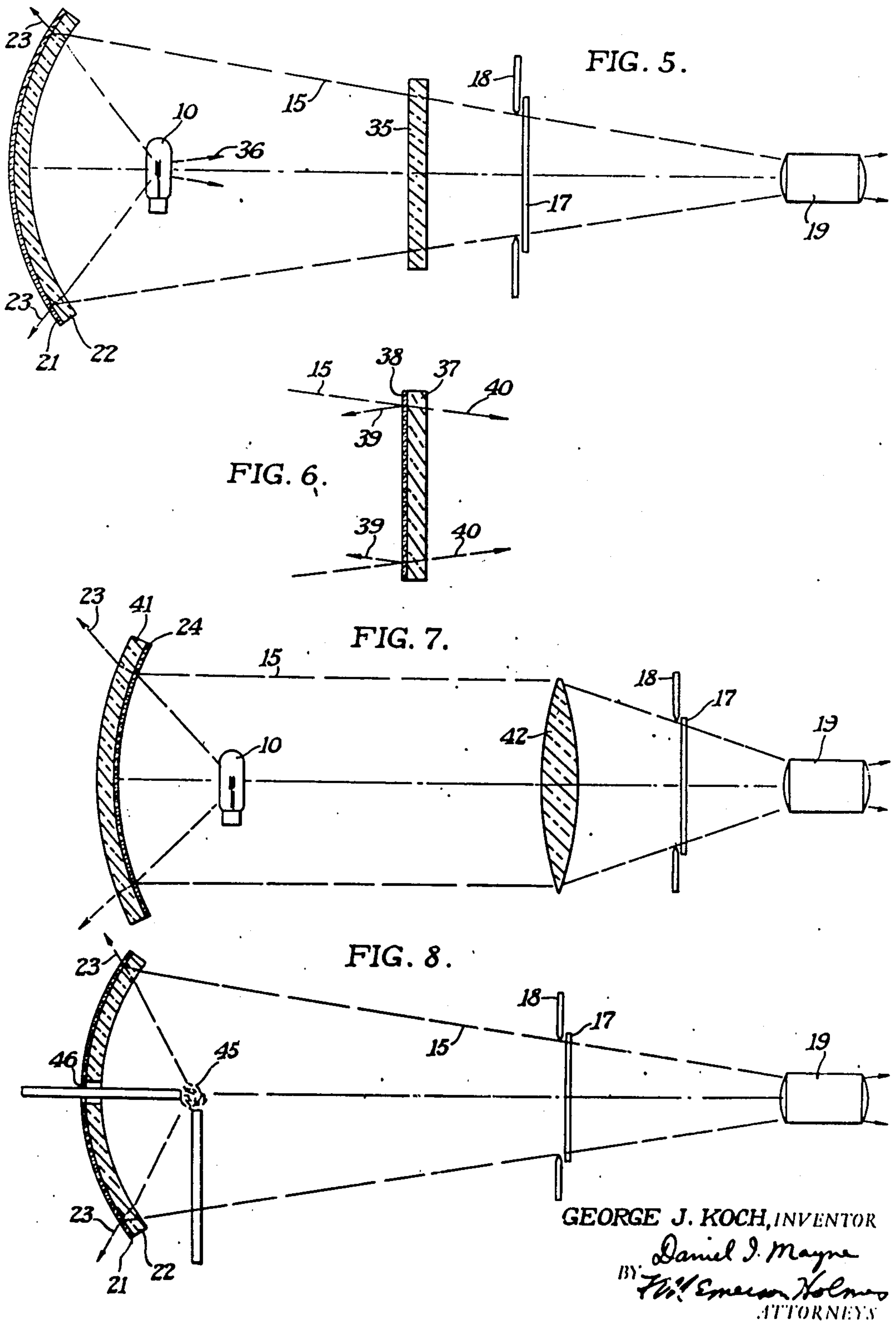
Fig. 5 is similar to Fig. 2 with the addition of a heat filter.
Fig. 6 illustrates an optical interference infrared reflector which may be used in place of the heat filter of Fig. 5.

Fig. 7 similarly illustrates an optical system employing both a front surface concave reflector and a condenser lens.

Figures 1, 2, 3, 4:
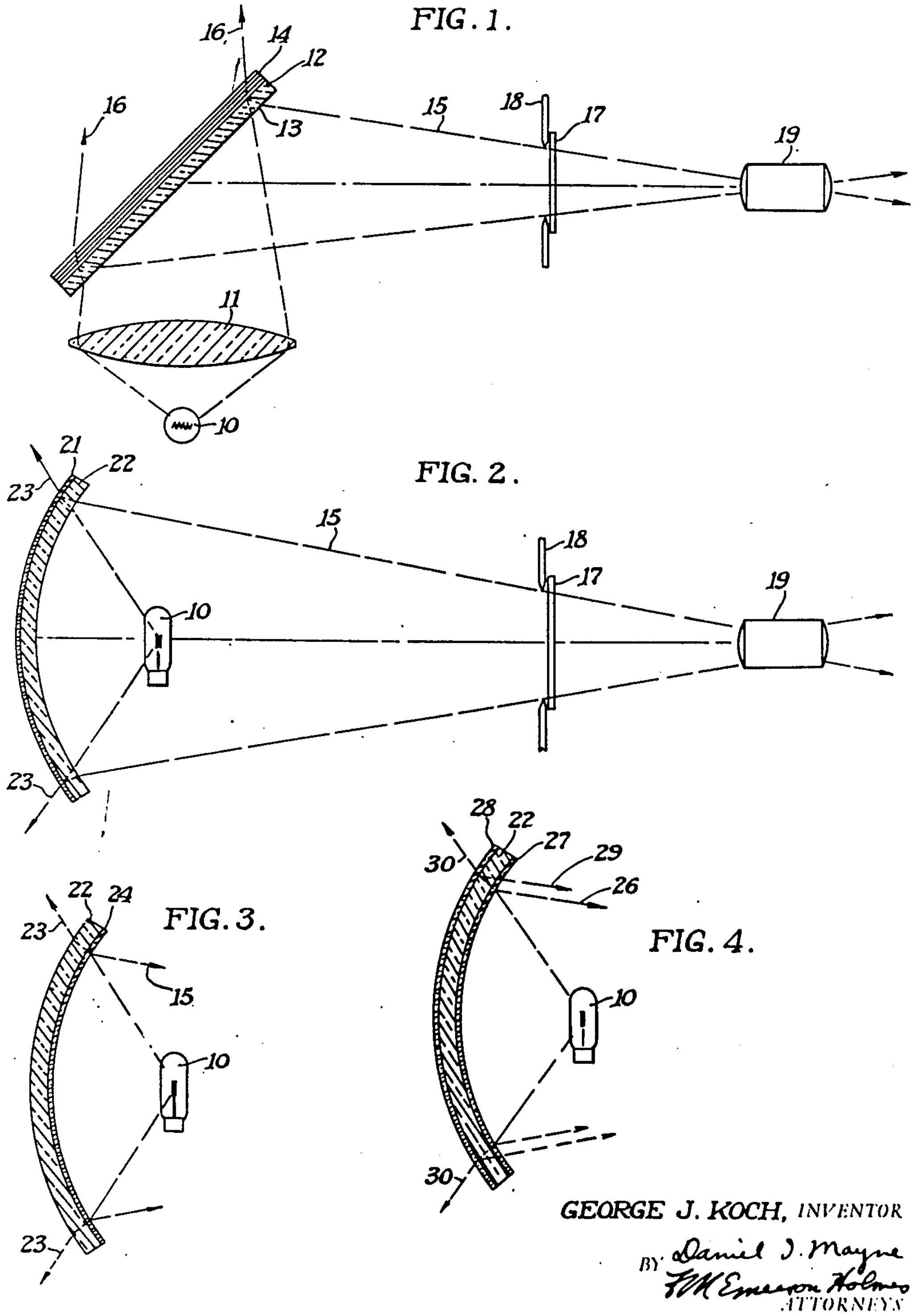

Fig. 8 is similar to Fig. 2 but employs a carbon arc instead of an incandescent lamp as the light source.

Figs. 9–22 inclusive are graphs of intensity as ordinates against wavelengths in microns on a semi-log basis as abscissae.

Figure 9:
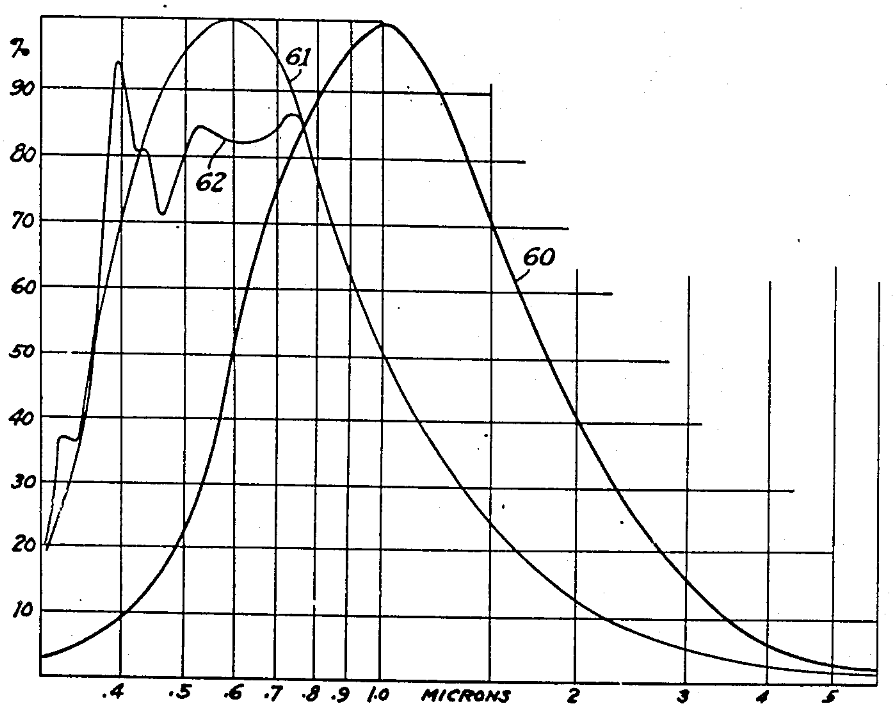

Fig. 9 shows the relative intensity output of a thousand watt tungsten lamp, a black body at 5000° K. and a carbon arc lamp.

Figure 10:
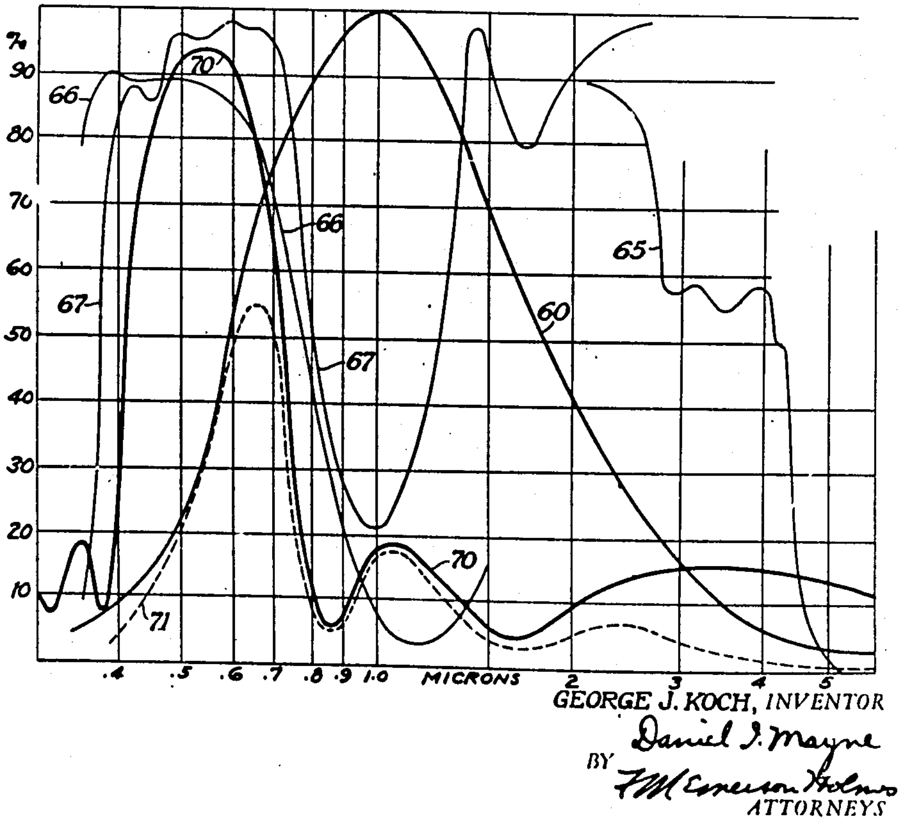

Fig. 10 shows the intensity output of a thousand watt lamp, the absorption of ordinary glass, the absorption of one of the best heat filter glasses available, the transmission of an optical interference heat filter, the reflection of an optical interference mirror according to the present invention, and the effect of the latter on the light from the thousand watt lamp.

Figures 11, 11A, 11B, 11C, 11D, 11E, 12, 12A, 12B, 12C, 12D:
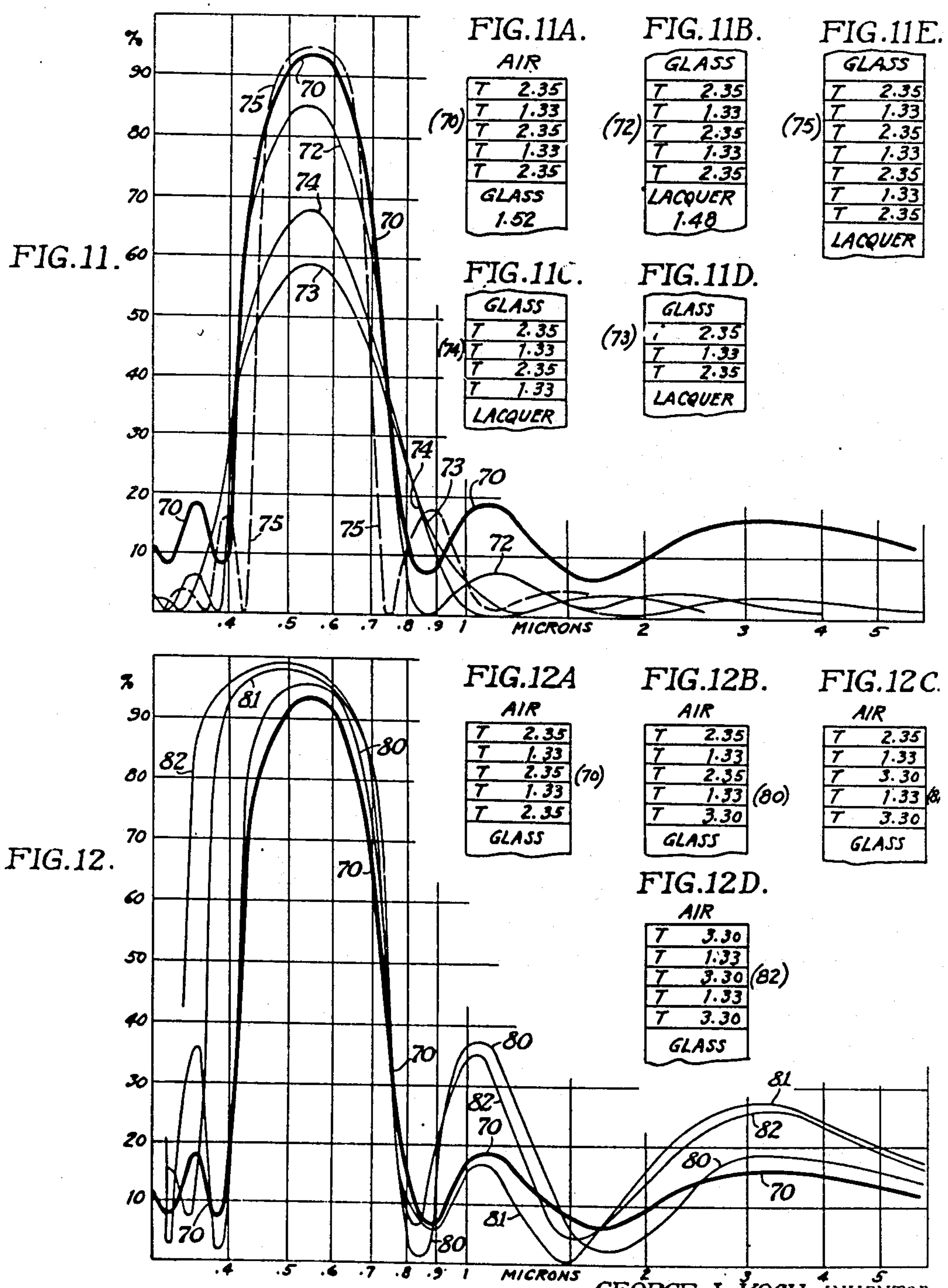

Fig. 11 shows the computed (first approximation) reflection intensity curves for reflectors according to the invention employing 3, 4, 5 and 7 quarter wavelength layers between glass and lacquer and 5 layers between glass and air; these embodiments are illustrated schematically in Figs. 11A—11E.

Fig. 12 illustrates the effect of substituting 1, 2 or 3 layers of high index material greater than 3.0, the examples being shown in Figs. 12A–12D.

Figures 13, 13A:
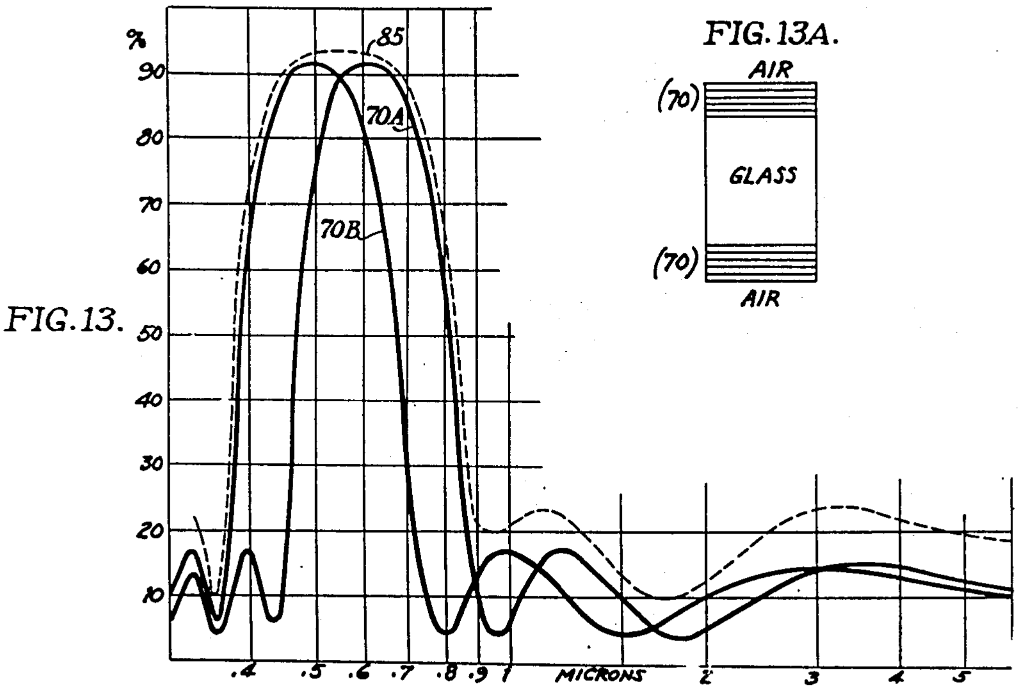

Fig. 13 shows the effect of interference coatings on both surfaces of the reflector, as illustrated by Fig. 13A.

Figs. 14, 14A, 14B, 14C, 15 and 15A similarly illustrate the effect of varying the relative thickness of 1 or 2 of the layers in the multi-layer coating.

Figures 16, 16A:
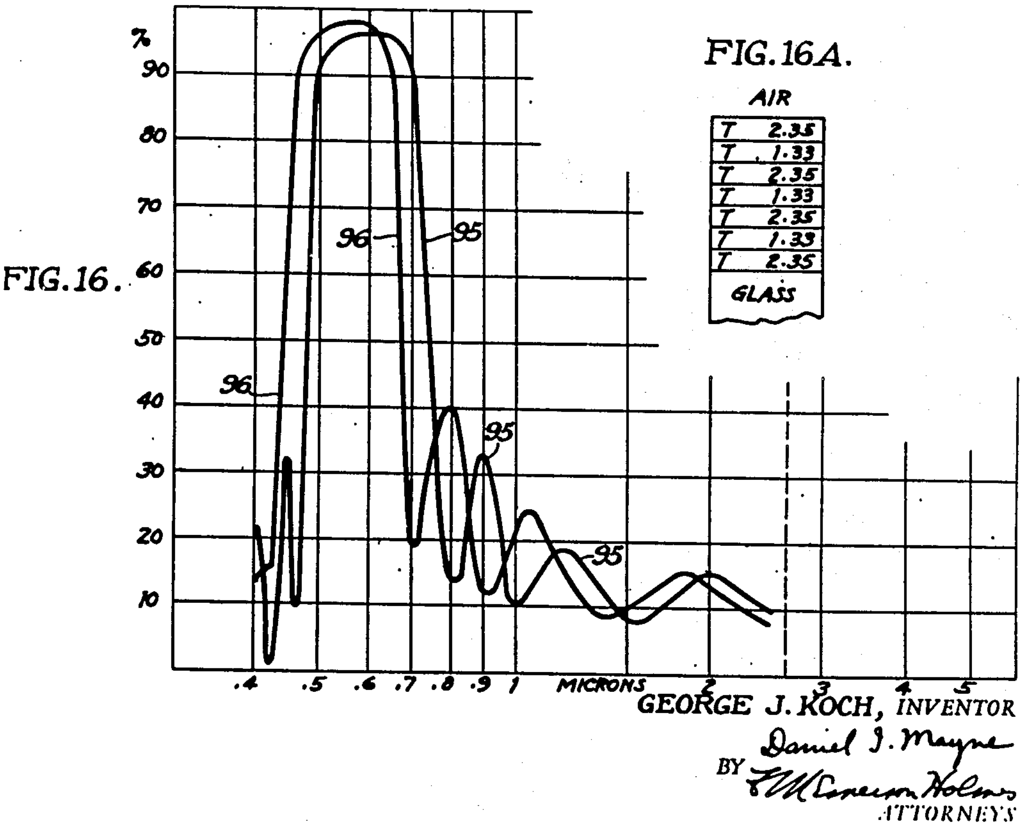

Fig. 16 shows actual measured curves for 2 coatings made approximately according to the illustration in Fig. 16A.

Figures 17, 17A, 18, 18A, 18B, 18C, 18D:
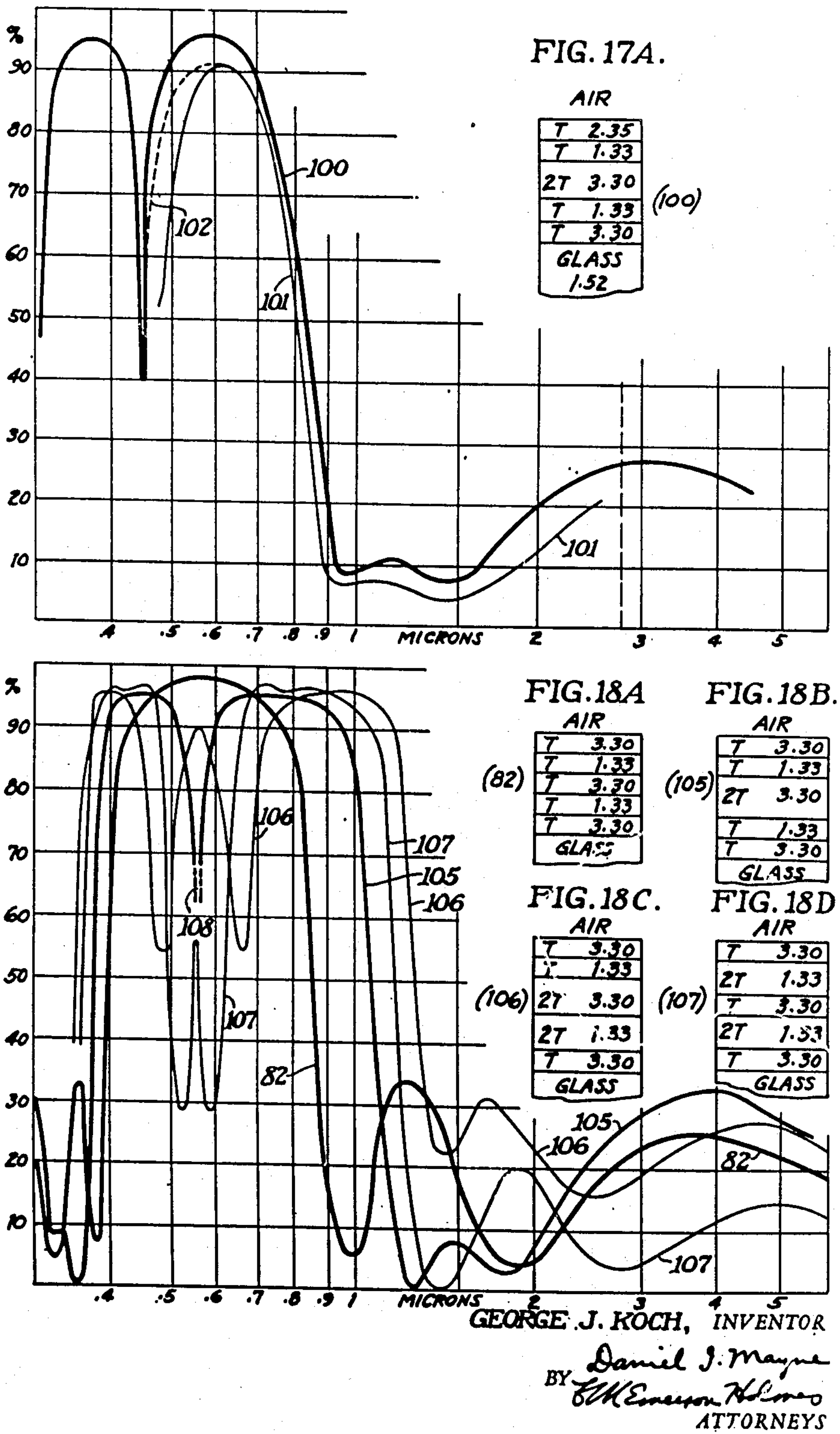

Fig. 17 shows the computed curve (not allowing for absorption and dispersion) of a coating employing high index material and a special thickness in one of the layers (as illustrated in Fig. 17A), and the actual reflectivity of a coating made according to these specifications.

Fig. 18 illustrates the effect of varying the thickness of one or more of the layers in a 5 layer coating, as shown in Figs. 18A–18D, keeping the reference layers a quarter wavelength thick for green light.

Figures 19, 19A, 19B, 19C, 19D:
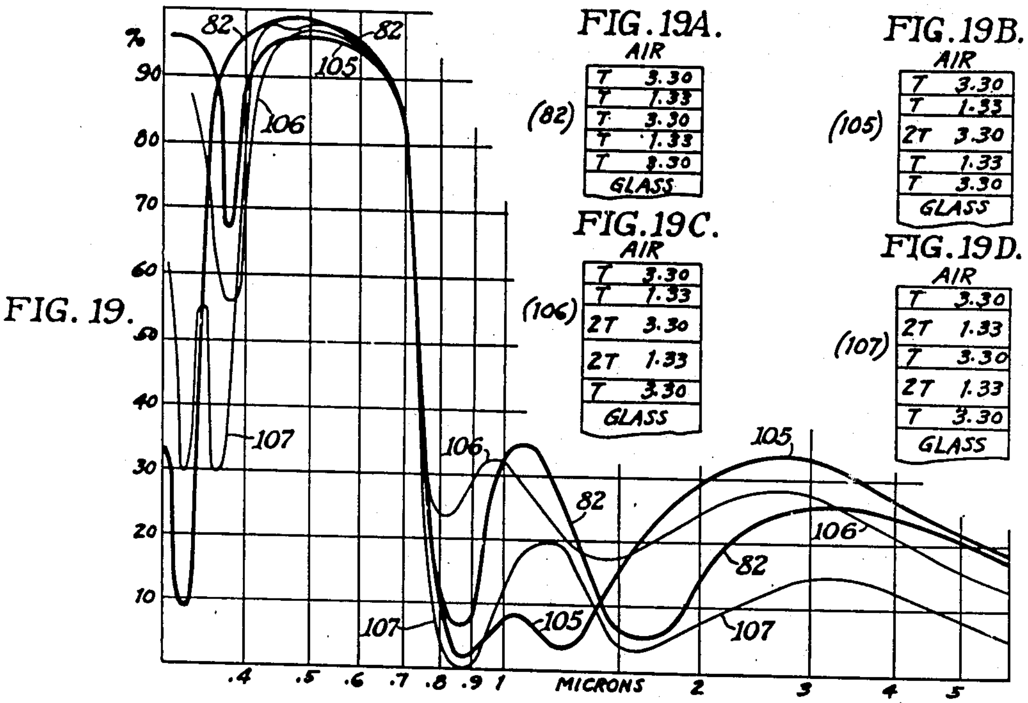

Fig. 19 shows the same curves all shifted to have 90% reflectivity at .67 micron; Figs. 19A to 19D correspond to Figs. 18A to 18D respectively.

Figures 20, 20A, 20B, 20C, 20D:
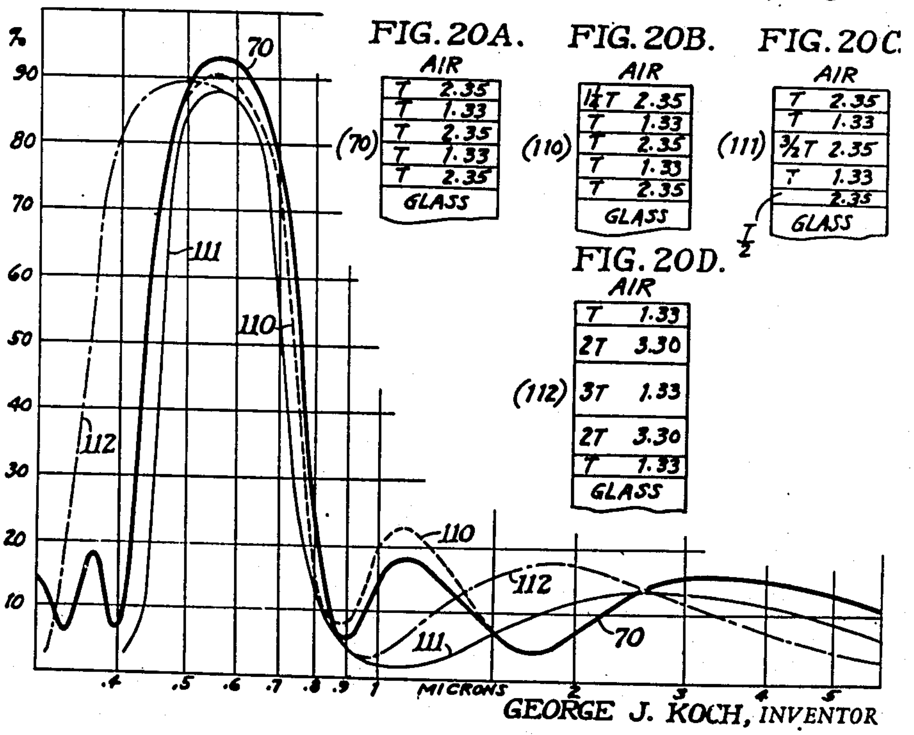

Fig. 20 similarly illustrates the reflectivity for coatings with only a slight variation in thickness as illustrated in Figs. 20A–20B and for slightly greater variations as illustrated in Figs. 20C and 20D.

Fig. 21 shows the computed reflectivity curves for highly preferred embodiments of the invention employing 7 layer interference coatings between glass and lacquer with slight variations in thickness of some of the layers and with an index of refraction greater than 3 in at least one of the layers, specifically as illustrated in Figs. 21A to 21C.

Fig. 22 similarly shows the effect of one layer being ⅓ or ⅘ the thickness of a quarter wavelength layer, as shown in Figs. 22A and 22B.

In Fig. 1 light from a source 10, in this case a 1000 watt tungsten lamp, passes through a condenser lens 11 to a plane reflector 12 oriented at 45° to the light beam. The front surface 13 of this reflector may be plain or may be provided with a reflection reducing coating or, as discussed below in connection with other embodiments of the invention, may have a special multi-layer coating thereon. The essential feature of the present invention as shown in Fig. 1 is that the rear surface of the reflector 12 is provided with an optical interference multi-layer coating comprising at least 4 layers 14, arranged to reflect most of the visible light illustrated by rays 15 and to transmit most of the infrared light illustrated by rays 16. Thus the infrared radiation passes harmlessly to one side. The visible light 15 passes through a transparency 17 located in a gate defined by a frame 18. The light from the source is concentrated in a projector lens 19 which projects an image of the transparency 17 to a screen, not shown. The transparency 17 represents either a colored or black and white still picture or a frame of a motion picture film moving past the gate 18. The transparency 17 absorbs some of the visible light in the rays 15 and is thus heated somewhat but this is unavoidable since the picture is projected thereby, but the multi-layer coating 14 eliminates the infrared radiation or at least reduces it greatly so that the transparency 17 is not unnecessarily heated. When the light is reflected from the multi-layer coating 14, at 45° as shown, the thicknesses of the layers must be computed for this particular angle of incidence. Reflectivity varies relatively rapidly with angle of incidence at this obliquity so that the system shown in Fig. 1 is not as efficient as those discussed below and its use is confined to optical systems employing substantially parallel light at the mirror.

In Fig. 2, a highly preferred embodiment of the invention is shown in which light from the source 10 is reflected by a rear surface coating 21 on a concave reflector 22 to send a concentrated beam of visible light 15 throughout the transparency 17 at the gate 18. As before, infrared radiation represented by rays 23, passes harmlessly to the rear of the reflector 22. The light from the source 10 can be considered as striking the coating 21 at normal incidence, in this case, since small variations from normal do not appreciably affect the operation of a coating computed for normal incidence. Since the individual layers of the coating are all less than a wavelength of light thick, the individual layers are illustrated only in Fig. 1 and in the schematic diagram accompanying the graphs to be discussed later, and the whole coating is represented only by a single area in Figs. 2–8. It is to be understood however, that this coating is made up of at least 4 layers, preferably 5 or 7 and may have any number of layers but for practical reasons one does not normally go beyond 11 layers.

In Fig. 3 the concave reflector 22 has the optical interference highly reflecting coating 24 on the front surface thereof but otherwise this embodiment is similar to that shown in Fig. 2. It is usually an advantage to have the coating on the reflector surface farthest from the light source for protective reasons.

In Fig. 4 the coatings on the reflector 22 are on both surfaces which has the optical advantages which will be discussed in connection with Fig. 13. In this arrangement part of the visible light 26 is reflected from the coating on the first surface and the rest of the visible light and infrared light are transmitted through this first surface coating 27. This transmitted part is then divided further by the rear surface coating 28 which reflects most of the visible light 29 and transmits most of the infrared light 30. The reflected portion 29 is of course transmitted by the coating 27 since it was already transmitted once thereby, and this portion 29 joins with the portion 26 to illuminate the transparency with substantially neutral white light.

Fig. 5 is similar to Fig. 2 except for the inclusion of a heat absorbing glass 35 immediately in front of the transparency 17. The heat absorbing glass tends to reduce further any residual infrared radiation present in the reflected rays 15 and also to reduce the infrared radiation passing directly from the source 10 to the transparency 17 as indicated by rays 36. Of course, the percentage of radiation passing directly from the source to the transparency is very small compared to that concentrated by the reflector 22 so as to pass through the transparency 17. However, when extremely intense light sources are used, the additional protection of a heat filter 35 is sometimes useful. This heat filter 35 may also be in the form of a multi-layer interference coating as illustrated in Fig. 6. In the latter figure a glass plate 37 is provided with a first surface coating 38 which reflects infrared radiation 39 and transmits visible radiation 40. The inefficiency of such interference coatings compared to the present invention will be discussed in connection with Fig. 10 but they are more highly efficient than heat absorbing filters such as 35, in some respects.

Fig. 7 differs from Fig. 2 mainly in that the condensing action is not all assigned to the concave reflector but is shared with a condenser lens. Also, Fig. 7 has the first surface coating of the type shown in Fig. 3. That is the concave reflector 41 is not as strong as that shown in Figs. 2 and 3. The visible light rays 15 are further concentrated by condenser lens 42 to pass through the transparency 17 and to come to focus in the objective 19. Since ordinary crown glass absorbs the infrared highly from 2.7 microns out, the glass of the condenser 42 acts as a heat filter in this respect and the selection of the multilayer coating 24 is perhaps made easier. However, the radiation from most light sources is not too intense out at these extremely long wavelengths so that this feature is not as important as some of the others discussed here.

Fig. 8 is similar to Fig. 2 but the light source is replaced by an arc 45, one carbon of which passes through an aperture 46 in the mirror 22. As discussed below, the coating 21 is preferably arranged differently for a carbon arc source 45 than for a tungsten lamp 10, but the same coating may be used in both cases if desired.

Figs. 9-23 are all plotted with the abscissae logarithmic between .3 and 6 microns wavelength. The reason for using semi-log paper in plotting all of these graphs is because of one characteristic of the first approximation reflectivity curves for multi-layer interference coatings. As mentioned above, these reflectivity curves (first approximation) ignore the effects of dispersion and assume that the index of refraction is the same for all wavelengths. When this assumption is made and a reflectivity curve is plotted the curve may be slid anywhere along the wavelength scale, provided it is plotted logarithmically as shown. That is, the same curve holds for various thicknesses of the interference layers, provided the thickness ratios stay the same. For instance, the curve for a coating with layers a quarter wavelength thick for red light is identical to one for blue light except that it is displaced accordingly along the wavelength scale. In the diagrams adjacent to the curves Figs. 11 to 22, the relative optical thicknesses are indicated as multiples of "T" and the index of refraction is given for each layer.

In Fig. 9 the curve 60 is the relative intensity of emission for a thousand watt tungsten lamp, i. e. for a black body at about 3200° K. The curve 61 is a similar relative emission curve for a black body at 5000° K., slightly less than mean noon daylight. For the projection of colored pictures it is desirable to illuminate the transparency with the equivalent of a black body radiation somewhere between that of 60 and that of 61. Both of these curves are arbitrarily drawn to have their maxima at 100%. The curve 62, which is approximately the same as the curve 61 through the infrared region of the spectrum and is drawn as being exactly the same, is the relative emission curve for a carbon arc. Carbon arcs vary somewhat in their emission curves and special carbons for special purposes are available. The curve 62 is for a high intensity arc which is perhaps the commonest of all those in normal use for high intensity purposes. The visible spectrum is between .4 and .7 micron and the effective visible spectrum is between .45 and .67 micron. However, the high intensity of the arc between .4 and .46 micron causes it to appear slightly bluish compared to daylight or to a black body at 5000° K. The thousand watt tungsten lamp is definitely reddish by comparison to either of the other sources, as indicated by the rapid rise between .45 and .67 micron of the curve 60, but this kind of illumination has been found satisfactory for the projection of black and white and colored pictures. Colored pictures are often balanced for this color of illumination but whether they are correctly balanced or not, the illumination of a thousand watt lamp has been found to be quite acceptable to most people. In other words, Fig. 9 illustrates the well known fact that the human eye is well satisfied with any illumination between that shown by curve 60 and that shown by curve 61 although other types of illumination which might cause the object to appear highly colored are objectionable even though the degree of difference is not as great as that between curve 60 and curve 61.

In Fig. 10 the curve 60 is repeated for comparison. In this figure the ordinates represent the relative intensity of emission for the curve 60, the relative intensity of transmission for a relatively thin sheet ordinary glass represented by curve 65 and a special heat absorbing glass represented by curve 66 and the transmission of an infrared reflecting, visible transmitting, multilayer interference film used as a substitute for heat absorbing glass. The infrared reflecting, visible transmitting, curve is shown at 67. It should be noted that the curve 67 is steeper than the curve 66 between .7 and .9 micron and hence is more efficient than the best heat absorbing filter in this region. The two could be combined to get low transmission around 1.0 to 1.2 microns and to transmit the visible fairly well. However, the transmission curve begins to rise again and in the case of the curve 67 reaches a maximum at 1.5 microns. This is an inherent difficulty in the use of multi-layer interference coatings as infrared reflectors. As mentioned above, if the coatings are made to transmit visible light highly as in the case of the curve 67 they also transmit a large portion of the infrared highly and reflect only the near infrared between .8 and 1.3.

The present invention on the other hand, uses multi-layer interference coatings in an entirely different way, so that the reflected part of the light is used usefully and such coatings inherently are highly efficient throughout the whole of the infrared region in transmitting the infrared. A typical curve is shown at 70. It will be noted that this curve reflects over 80% between .45 and .67 micron and has a minimum reflectivity at .85 micron. Furthermore, throughout the infrared its reflectivity never rises above 20%. This is a first order computed curve and in actual practice the dispersion causes the minimum to come at about .8 and the first side maximum is actually slightly higher and comes between .9 and 1.0. This is the curve for a five layer coating and it will be used as a reference standard in discussing the modifications thereof.

Further, in this Fig. 10 the broken line 71 is approximately the product of the curve 70 and the curve 60 illustrating the fact that the emission throughout the visible remains practically unchanged but that the emission throughout the infrared is very low indeed and falls off to practically zero for long wavelengths. The curve 70 is much steeper than the curve 66 and the latter is by far the best of heat absorbing filters. Thus, even the simplest and perhaps least efficient form of the present invention is much better for the elimination of infrared radiation than any heat absorbing filter (66) or an infrared interference reflector (67).

In the remainder of the figures the numeral designating the curve is shown in parenthesis adjacent to a greatly magnified cross section of the corresponding coating which is illustrated adjacent to the curve in each case.

In Fig. 11 the curve 70 is repeated representing a five layer coating of alternating quarter wavelength layers of zinc sulfide and cryolite between glass and air. Thus the optical thickness T of each layer is a quarter wavelength. If this coating is provided with a protective layer of lacquer having an index of refraction of 1.48 so that the zinc sulfide (index 2.35) and cryolite (index 1.33) layers are sandwiched between glass of index 1.52 and lacquer, the curve 72 results which is slightly lower in the visible part of the spectrum and which is very much lower throughout the infrared and ultraviolet parts of the spectrum. In fact, the minima in the infrared appear to go nearly to zero for this first order calculation and the maxima rise only to 7% in the infrared. Thus the curve 72 corresponding to the Fig. 11B is a highly preferred embodiment of the invention still using only zinc sulfide and cryolite, in the interfering layers.

Fig. 11 is also intended to illustrate the effect of additional layers. The reflectivity for a 3 layer coating between glass and lacquer is shown at 73. This has low visible reflectivity and an infrared reflectivity which is no better than the absorption of heat absorbing filters. Therefore, one must go to at least 4 layers as illustrated by curve 74 which is slightly better. Preferably, however, one uses 5 layers as shown by curve 72 or 7 layers as shown by the curve 75. It should be noted that the curve 75 has a reflectivity peak which has become very narrow and does not quite cover the whole of the visible spectrum. This can be useful for certain purposes such as correcting the color temperature of the light source being used and, in those cases where it is not useful, it can be corrected either by using a higher index material with an index greater than 3.0 for the high index layers or by varying the thickness T of 1 or more of the layers relative to the other layers. If all of the layers are proportionally increased or decreased in thickness, the reflectivity curve merely shifts to the right or left along the wavelength scale. In this Fig. 11 all of the layers have a thickness T optically equal to a quarter wavelength for green light. The curves shown do not allow for any absorption or for dispersion, both of which tend to bring the valleys and peaks in the infrared nearer the visible and to spread those in the ultraviolet somewhat. Zinc sulfide and cryolite have no appreciable absorption in the visible or infrared part of the spectrum.

Fig. 12 is similar to Fig. 11 and curve 70 is reproduced therein. The curves in Fig. 12 are all for quarter wavelength layers but two of them are shifted toward the shorter wavelength region because by the introduction of high index materials the reflection peak is spread so far that it is much more than adequate to cover the visible spectrum and in practice it is never necessary to have a reflectivity over 90% at wavelengths longer than .67 micron. Curve 80 is for a coating which differs from that of curve 70 by the substitution of stibnite for the high index layer nearest the glass in place of zinc sulfide. Stibnite has an index of refraction which is about 3.30 when coated in a quarter wavelength layer. The actual index depends on the rate at which the layer is deposited but does not vary far from 3.30 for green light. Also the curve 80 does not take into account the absorption by stibnite in the blue and near ultraviolet regions of the spectrum. This absorption causes the reflectivity in the blue region of the spectrum to fall off for two reasons, first because of the absorption itself and second because of the effect of absorption on the optical properties at the interfaces as discussed above. The curve 80 has its peak in the green region since the introduction of one layer of stibnite is not sufficient to raise the reflectivity at .67 micron to 90%. When a second stibnite layer is added as shown in Fig. 12C the peak reflectivity rises to about 98% and if this were held in the green region, the reflectivity would be above 90% out nearly to .8 micron. Therefore all of the layers are made slightly thinner so as to be a quarter wavelength for about .5 micron, specifically so that the reflectivity curve has a value of 90% at .67 micron. In practice, the curves are computed without reference to any particular wavelength and then are slid along the wavelength axis until they peak at any desired point or have the value of 90% at .67 micron as in the present case. Again the absorption in the blue and ultraviolet region of the spectrum by stibnite is ignored. The addition of one stibnite layer as shown by curve 80 produces a very low minimum in the near infrared but the first peak coming at about 1.05 microns is much higher than for the curve 70. The addition of a second stibnite layer eliminates this high side band in the infrared although it appears to make the side band at 3 microns somewhat higher but this is in general harmless as explained in connection with Fig. 10. Also sandwiching either of these coatings between glass and lacquer tends to reduce these relatively high side bands. The introduction of a third stibnite layer as illustrated by curve 82 widens the reflection peak still more and makes the curve fall off between .67 and .8 micron very rapidly. For all practical purposes the curves 80 and 82 are identical in the near infrared and the curves 81 and 82 are identical from 1.6 microns out.

Fig. 13 illustrates the effect of placing a five layer coating of the type here referred to as 70 on both sides of a glass reflector with the curve 70A for one of the layers having a peak at .6 micron and the curve 70B for the other layer having a peak at .5 micron. The total reflectivity from such a reflector is represented by a broken line 85 which includes both the light reflected by the first surface and that portion of the light transmitted by this surface which is reflected by the second surface and again transmitted by the first surface. This curve 85 has a quite broad reflection peak covering the whole of the visible between .45 and .67 micron with a reflection intensity greater than 90% and it falls off to about 20% by .9 micron. The use of two 7 layer coatings such as represented by curve 75 in Fig. 11 provides substantially the same coverage through the visible part of the spectrum and a more rapid drop in the infrared region. The infrared transmission can be improved by providing a lacquer layer as an outside coating in both cases so that the curve 70 is replaced by the curve 72 of Fig. 11.

Figures 14, 14A, 14B, 14C:
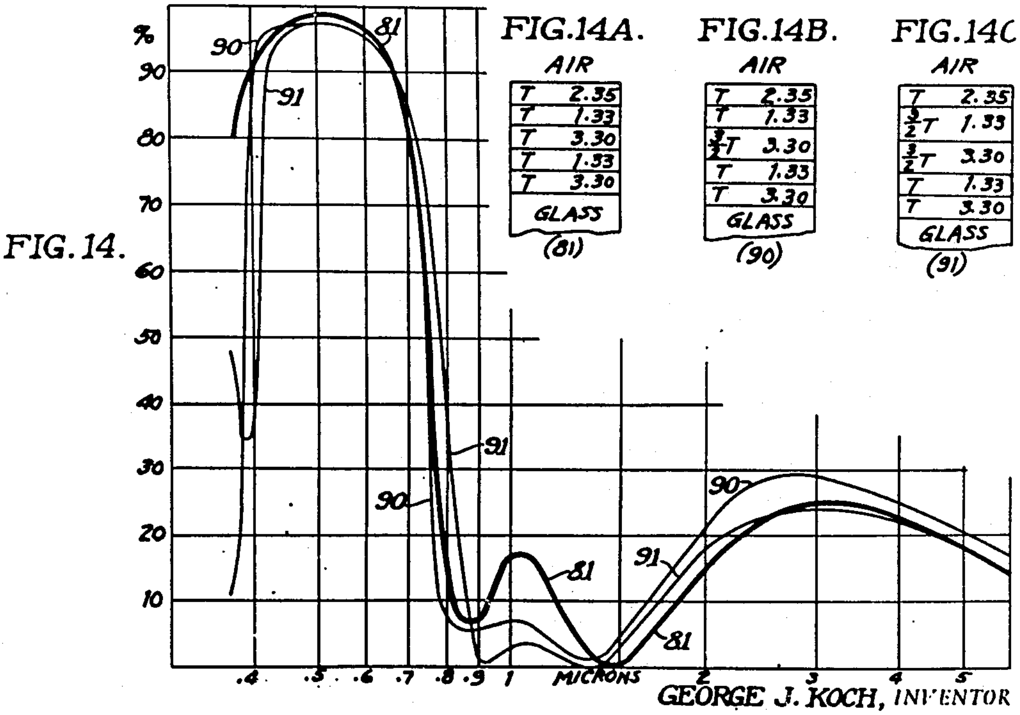

Fig. 14 repeats the curve 81 of Fig. 12 and then by curves 90 and 91 illustrates the effect of increasing the thickness of the middle layer by 50% relative to the other layers and also of increasing both the middle and one of the low index layers by 50% relative to the other layers. The curve 90 has the middle layer of stibnite with an optical thickness 1½ times that of the other 4 layers (indicated in Fig. 14B as 3/2T). If the other 4 layers are made to have a quarter wavelength thickness for .5 micron as is the case for curve 81 (so that curve 81 passes through the 90% reflection line at .67 micron) the curve 90 would be further to the right with its minimum (which now falls at .37 micron) coming at .5 micron. However, the curve 90 has been shifted to the left to bring it to 90% at .67 micron. That is, the center layer is now 1½ times a quarter wavelength for .37 micron and the other layers are a quarter wavelength for .37 micron. Curve 91 is for the arrangement shown in Figure 15C where both the middle stibnite layer and the upper cryolite layer have a thickness 1½ times that of the other 3 layers. This curve too would be shifted to the right if the 3 layers had a quarter wavelength for green light, but it is also adjusted to bring its reflectivity to 90% at .67 micron. All of these curve shifts are to make the curves directly comparable as far as practical results are concerned. The actual coating thicknesses are controlled photoelectrically to have a quarter wavelength at any preselected value of the monochrometer used in the photoelectric thickness guage. The method of controlling the thickness of layers is well known and is not part of the present invention.

It will be noticed that the curves 90 and 91 are much more efficient at transmitting infrared radiation between .09 and 1.3 microns than the curve 81. In fact, the arrangements represented by the curves 90 and 91 are highly preferred embodiments of the invention particularly when the outer layer is provided with a protective lacquer so that the index is about 1.48 instead of 1.0 (air).

Figures 15, 15A:
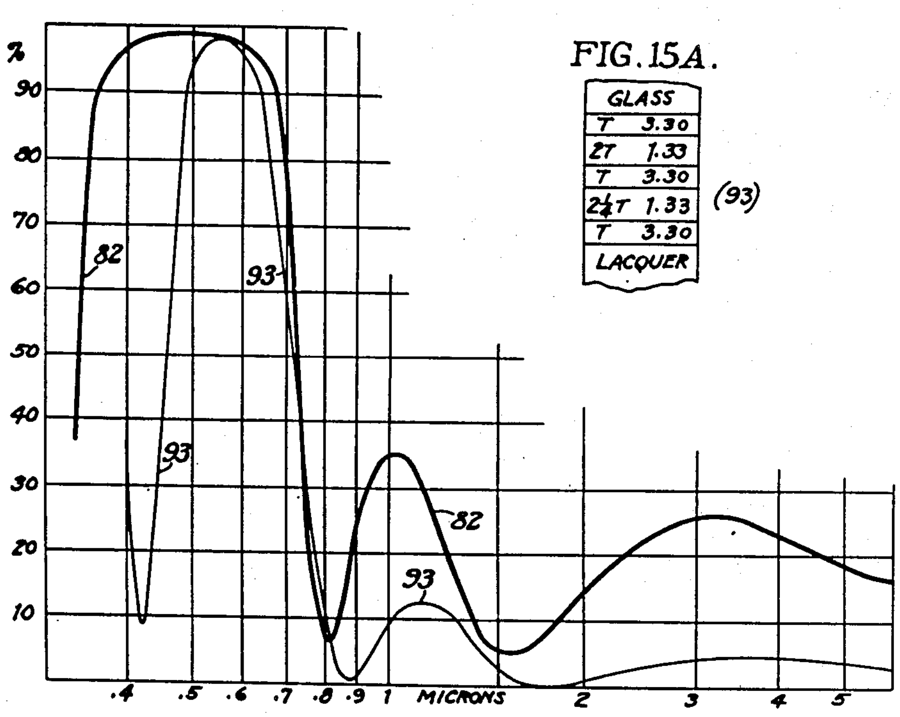

Fig. 15 reproduces curve 82 to illustrate what happens when the cryolite layers are increased to 2T and 2¼T while the stibnite layers remain at T thickness. Curve 93 is located to peak in the green. The infrared reflectivity is very low and the visible reflectivity is acceptably high although a little low at .67 micron.

Fig. 16 shows actual measured curves for 2 coatings made of zinc sulfide and cryolite in alternate wavelength layers 7 layers thick. In both of these cases only visual judgment of the color was used for controlling thickness. As discussed in connection with Fig. 14 slight variations in thickness of one or more layers relative to the rest of the layers can change the appearance of the curve a great deal; it will be noticed that the first side band in the ultraviolet for curve 96 has been depressed as compared with one for curve 95. This is probably due to the fact that one of the high index layers has been made somewhat thinner than specifications. These two curves represent about the maximum variation one obtains in practice when the thickness of the layers is controlled visually. But with photoelectric control of thickness the variation is never this great and is so small as not to be easily illustrated on a graph of this type. These curves should be compared directly with the curve 75 of Fig. 11 except that curve 75 has the added advantage of lacquer in place of the air shown in Fig. 16A. That is, the curve 75 does not come as high in the visible but falls much lower in the infrared. The fact that the tops of the curves 95 and 96 are flatter and spread over more of the spectrum than curve 75 is due to slight variations in thickness of the layers. This is helpful rather than harmful. Comparing the curve 95 which peaks at .6 micron with the curve 75 which peaks at .55 micron one finds two slight differences. First, the infrared side bands (curve 95) are somewhat higher, partly due to the use of air instead of lacquer in the actual coating represented by curve 95, and partly due to dispersion which is not taken into account in computing the curve 75. The second difference is that the side bands in the infrared part of the curve 95 are all shifted so as to be closer together and closer to the visible than those in the computed curve 75. This is due to dispersion since the computed curve assumes a constant index of refraction throughout the whole of the spectrum whereas actually the index of refraction of zinc sulfide falls off from 2.35 in the green to a value of about 2.0 in the infrared. However, for most practical purposes the simple computed curves are so similar in appearance to the actual results that the effects of dispersion, absorption, etc. need not be taken into account in the infrared region although one normally must bear in mind that the side bands in the infrared will in practice be nearer the visible and that the highly desirable drop off between visible reflectivity and infrared reflectivity will be even steeper than that computed with first order approximations.

Fig. 17 similarly compares a computed curve with actual measurements. The curve 100 is for a 5 layer coating between air and glass with one layer of zinc sulfide, 2 layers stibnite and 2 layers of cryolite, the middle layer being of stibnite with a thickness twice that of the other layers. The curve has been shifted so that the layers are a quarter wavelength for about .45 micron and the curve is represented by the solid line 100. This curve 100 is similar to curve 105 of Fig. 19 except the latter has 3 instead of 2 layers of stibnite. An actual coating made as shown in Fig. 17A has reflectivity shown by the broken line curve 101 with a peak at about the same place and having a minimum in the near infrared at .94 rather than at .98 due to the dispersion which is not taken into account in computing the curve 100. The reflectivity in both the visible and infrared is somewhat less in practice than for the computed curve. Actual measurements are for transmission and hence affected beyond 2.7 microns by the absorption of glass (indicated by a broken line). Therefore curve 101 is not drawn beyond 2.7 microns. The actual curve 101 falls off in the blue part of the spectrum at longer wavelengths than would be expected from the computed curve 100. This is largely due to the absorption in the stibnite layers. That is, if the dispersion alone were taken into account in computing the curve 100, this curve (100) would fall substantially on the curve 101 from a long wavelength of about 2 microns to about .6 micron and then would deviate therefrom as indicated approximately by a broken line 102. The difference between the curve 102 and the curve 101 is caused by the absorption of stibnite.

The agreement between first order approximation computed curve 100 and actual measurements is such that the first order computations are in practice quite satisfactory as a definition of the invention.

Fig. 18 repeats the curve 82 of Fig. 12 with the peak thereof shifted to the green. Then, for direct comparison therewith are three curves 105, 106 and 107 which have the quarter wavelength layers held at this value for green light and have certain of the layers changed in thickness. Curve 105 for example has the middle layer of stibnite (index 3.30) double the thickness of each of the other four layers. Doubling the thickness of the middle layer causes a dip shown by broken lines 108 in the center of the curve, i. e. at .55 micron. This dip theoretically goes right down to 0 reflectivity but any slight variation in the thickness of one or more of the layers causes the actual reflectivity in this narrow band to be somewhat greater than 0. Furthermore, analogue computing mechanisms used for computing the curves often do not have sufficient accuracy to compute the narrow band 0 value. Thus computations and practice agree and give a value for the minimum somewhere below 70% and perhaps down to 10 or 20%. When the thickness of one of the cryolite layers is also doubled as shown by curve 106, a hump or peak reappears in the center of the reflection band, and the total band becomes still wider. If only the cryolite layers are doubled in thickness, as shown by curve 107, the dip in the center of the band is quite wide with a very narrow peak in the very center of the dip. Of course, coatings would not ordinarily be made in the forms represented by curves 105, 106 and 107 since they do not reflect the visible and transmit the infrared efficiently. However, these curves may all be shifted keeping the thickness ratios as they are but selecting different wavelengths for monitoring the thicknesses.

In Fig. 19 this is done for the four examples shown in Fig. 18 and all of the curves are brought together to give 90% reflectivity at .67 micron. Curve 82 now has its peak at about .47 micron and falls to about 7% at .85 micron. Curve 105 has its center dip at about .38 micron and has a minimum at about .86 micron. Curve 106 has its secondary peak in the middle of the reflection band at about .32 micron and has its minimum at about .82 micron equal to about 23%. Curve 107 has its secondary peak in the middle of the reflection band at about .34 micron and falls to almost 0 at .86 micron. Curves 105 and 107 are the best of those illustrated in this example.

In Fig. 20 the curves illustrate the effect of slight variations in thickness ratios. Curve 70 which has appeared in several of the previous figures is reproduced for comparison. If the upper layer of zinc sulfide is increased in thickness to a value 1¼ times that of the other layers the resultant curve shown by broken lines 110 is only slightly different from curve 70. The reflectivity in the visible is reduced slightly and the reflectivity in the near infrared is increased slightly. If, however, the thickness of the middle layer is increased to 1½ times that of the upper two layers and the second layer from the glass, and the thickness of the layer next to the glass is reduced to ½ that of the three layers just mentioned, curve 111 results which has a somewhat narrower reflectivity band in the visible part of the spectrum but has excellent transmission throughout all of the infrared. The narrowing of the visible reflectivity may be overcome by introducing stibnite or other high index materials which, as pointed out above, gives even better cut off between the visible and infrared and low reflectivity in the infrared. Secondly the use of lacquer further tends to reduce the reflectivity in the infrared. Curve 112 is an interesting variation included for comparison. In this case, the five layers have optical thickness ratios of 1:2:3:2:1. Also the croylite layers are on the outside and only two stibnite layers are used. This may be considered as a 5 layer coating with the stibnite layers a quarter wavelength thick, the center cryolite layer 1½ quarter wavelength thick and the two outside cryolite layers ⅛ wavelength thick optically. To permit direct comparison curve 112 is shifted to match curve 111 at .67 micron and then it is found to give lower reflectivity around 1 micron but somewhat higher reflectivity around 2 microns than reference curve 70. It is not quite as good as curve 111 in the infrared region but it has a much broader reflectivity band in the visible than curve 111.

Fig. 21 illustrates 3 variations of a 7 layer coating with the curves shifted to have 90% reflectivity at .67 micron. In all three cases the multilayer coating is between glass and lacquer so that the infrared side bands are all quite low. Stibnite is included in one or more of the layers so that there are at least two interfaces with an index break greater than 1.6, which provides a wider reflectivity band and still steeper falling off of reflectivity on the edge of the visible spectrum, all of which is highly desirable. Curve 115 is that computed for the arrangement shown in Fig. 21A in which layer number 3 counting from the glass is zinc sulfide with a thickness 1½ times that of the other 6 layers optically. The computations do not take into account the absorption in the blue, the dip appearing there in curve 115 being that entirely due to simple interference. However, absorption is not compounded directly with this interference curve because the absorption itself affects the interference and the actual curve may be only slightly different from curve 115. It is noted that this curve has extremely low reflectivity throughout the infrared portion of the spectrum and even when the curve is corrected for dispersion the shifting of the side bands toward the visible will not spoil this highly desirable result appreciably. Curve 116 differs from 115 by improving the blue reflectivity considerably although this advantage is partially offset by the increased absorption due to the additional layer of stibnite illustrated in Fig. 21B. Also curve 116 is not quite as good as curve 115 around .8 to 1.0 micron, although it is much better than curve 115 at .75 micron. The reflectivity represented by curve 116 falls off very rapidly between .67 and .70 micron and it is substantially neutral through the visible spectrum. Curve 117 represents the reflectivity for the example shown in Fig. 21 in which all 6 layers next to the glass are a quarter wavelength thick but the outermost layer of stibnite next to the lacquer is only ⅛ of a wavelength thick. This arrangement gives most of the advantages enjoyed by curve 116 through the visible and most of the advantages enjoyed by curve 115 through the infrared. In fact at .8 micron it has the lowest reflectivity of any of the three curves. Dispersion will, of course, shift the infrared values all toward the visible slightly so that this minimum in the curve 117 actually occurs at .76 or .77 micron as discussed above.

In actual practice coating thickness are held close to a quarter wavelength with some of the variations here discussed, and highly desirable results are obtained with these or with other coatings having 7 or more layers (preferably with the above discussed thickness variations) and with lacquer on the one surface thereof, as will be apparent from the inspection of the curve shown in Fig. 21.

Fig. 22 shows the effect of thickness ratios differing from the 2:1 or ½:1 cases discussed above. Curve 120 for example shows the simple 5 layer case (curve 72 reproduced for comparison) with the thickness of the layer next to the lacquer only 1/12 of a wavelength rather than ¼ of a wavelength thick. Curve 121 similarly shows the effect when this particular layer is ⅕ rather than ¼ wavelength. In both cases the reflectivity through the infrared is extremely low although the curve 120 does not fall off as rapidly as might be desired at the edge of the visible spectrum.

I claim:

1. Illuminating means for the optical projection of transparencies without excessive heating thereof comprising a gate defining the position of a transparency during projection, an incandescent lamp emitting visible light and a high percentage of infrared radiation, optically aligned with the gate and a concave glass reflector behind and concave to the lamp for reflecting a concentrated beam of the visible light through and filling said gate, one surface of the glass reflector having an optical interference multilayer coating of alternately high and low index materials in at least four layers each of optical thickness less than a wavelength of visible light with the reflection amplitude vectors for the interfaces between layers, as determined by the index break at each interface and the thickness of each layer, adding, with squaring of the scalar part to give intensities, to an intensity value greater than 60% for any and all wavelengths between .45 and .67 micron with a maximum value at a wavelength between .40 and .58 micron and to a minimum between .7 and 1.0 micron.

2. Illuminating means according to claim 1 in which the coating includes an outside layer of lacquer more than a few wavelengths of light thick and with an index of refraction between 1.47 and 1.55.

3. Illuminating means according to claim 1 in which the coating absorbs some of the radiation in the blue region of the spectrum and in which said reflection vectors independent of the attenuation caused by said absorption add to said maximum between .40 and .48 micron to reduce the yellow color caused by said blue absorption.

4. Illuminating means according to claim 1 in which the coating includes at least two interfaces where the index break exceeds 1.6, in which there are at least two layers of different optical thicknesses, the ratio of the optical thicknesses being between 1¼ and 3, in which the optical thickness of the majority of the layers is substantially a quarter wavelength for blue light and in which the interface vectors, in terms of the index of refraction for the D line of the spectrum without allowance for dispersion or absorption, add, with squaring of the scalar part of the total to give intensities, to intensity values, on the average more than 90% between .45 and .52 micron; on the average more than 90% between .52 and .60 micron; on the average more than 90% between .60 and .67 micron; less than 60% at .7 micron; less than 15% at .8 micron; less than 15% at .9 micron, and on the average less than 25% between 1.0 and 3.0 microns.

5. Illuminating means for the optical projection of transparencies without excessive heating thereof comprising a gate defining the position of a transparency during projection, a light source emitting visible and a high percentage of infrared radiation and a glass reflector for receiving radiation from the source and reflecting visible radiation through the gate, one surface of the glass reflector having an optical interference multi-layer coating of alternating high and low index materials in at least four layers each of optical thickness less than a wavelength of visible light, said coating reflecting most of the visible radiation and transmitting most of the infrared radiation.

6. Illuminating means according to claim 5 in which said light source is an incandescent lamp and said coating reflects radiation between .45 and .67 micron approximately uniformly.

7. Illuminating means according to claim 5 in which said glass reflector is concave toward the source and reflects a concentrated beam of visible light.

8. Illuminating means according to claim 5 in which said coating includes an outside layer of protective lacquer with an index of refraction between 1.47 and 1.55.

9. Illuminating means according to claim 5 in which at least one of the high index layers has an index of refraction greater than 3.0 and absorbs blue light and at least one of the low index layers adjacent thereto has an index of refraction less than 1.4.

10. Illuminating means according to claim 9 in which the high index layer nearest the light source has an index of refraction between 2.0 and 3.0 and does not noticeably absorb any visible light.

11. Illuminating means according to claim 5 in which at least one of the high index layers has an index of refraction greater than 3.0 and absorbs blue light, at least one of the low index layers adjacent thereto has an index of refraction less than 1.4, and in which there are at least two layers of index of refraction N less than 3.0 with no noticeable absorption of visible light between the source and any layer which absorbs blue light.

12. Illuminating means according to claim 5 in which the other side of the glass reflector also has an optical interference multi-layer coating of alternating high and low index materials in layers of optical thickness less than a wavelength of visible light, the coating on the side farther from the light source highly reflecting visible light transmitted by the coating on the nearer side and both coatings transmitting most of the infrared radiation.

13. Illuminating means for the optical projection of transparencies without excessive heating thereof comprising a gate defining the position of a transparency during projection, a light source emitting visible radiation of given spectral distribution and a high percentage of infrared radiation and a glass reflector for receiving radiation from the source and reflecting visible radiation through the gate, one surface of the glass reflector having an optical interference multi-layer coating of alternately high and low index materials in at least four layers of optical thickness less than a wavelength of visible light with the reflection amplitude vectors for the interfaces between layers, as determined by the index break at each interface and the thickness of each layer, adding, with squaring of the scalar part of the total to give intensities, to intensity values at wavelengths between .45 and .67 micron which substantially balance said spectral distribution to reflect white light, and to a minimum intensity value at a wavelength between .7 and 1.0 micron.

GEORGE J. KOCH.

REFERENCES CITED

The following references are of record in the file of this patent:

UNITED STATES PATENTS

| Number | Name | Date |
|---|---|---|
| 1,342,894 | Bugbee | June 8, 1920 |
| 1,430,494 | Correll | Sept. 26, 1922 |
| 1,434,268 | Tillyer | Oct. 31, 1922 |
| 1,750,910 | Stark | Mar. 18, 1930 |
| 2,225,485 | Rantsch | Dec. 17, 1940 |
| 2,279,084 | Tillyer | Apr. 7, 1942 |
| 2,466,119 | Moulton et al. | Apr. 5, 1949 |
| 2,466,430 | Hutchison | Apr. 5, 1949 |

FOREIGN PATENTS

| Number | Country | Date |
|---|---|---|
| 475,318 | France | Feb. 16, 1915 |